United States Patent
Bortoli et al.

(10) Patent No.: US 8,622,697 B2
(45) Date of Patent: Jan. 7, 2014

(54) RAM AIR TURBINE BEARING SPACER

(75) Inventors: Stephen Michael Bortoli, Roscoe, IL (US); Gregory C. Hopkins, Caledonia, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 488 days.

(21) Appl. No.: 12/949,178

(22) Filed: Nov. 18, 2010

(65) Prior Publication Data

US 2012/0128495 A1 May 24, 2012

(51) Int. Cl.
B64C 27/54 (2006.01)

(52) U.S. Cl.
USPC .......................................... 416/1; 416/170 R

(58) Field of Classification Search
USPC .............. 415/4.1, 4.3, 4.5, 122.1, 124.1, 104, 415/229, 231; 416/55, 170 R; 29/889.21, 29/889.22; 384/517, 518, 563
See application file for complete search history.

(56) References Cited

U.S. PATENT DOCUMENTS

| | | | |
|---|---|---|---|
| 3,275,198 A | 9/1966 | Barlow | |
| 3,315,085 A | 4/1967 | Mileti et al. | |
| 3,774,466 A | 11/1973 | Bhatia et al. | |
| 4,742,976 A | 5/1988 | Cohen | |
| 4,991,796 A | 2/1991 | Peters et al. | |
| 5,174,719 A * | 12/1992 | Walsh et al. | 416/142 |
| 6,580,179 B2 | 6/2003 | Eccles et al. | |
| 6,676,379 B2 | 1/2004 | Eccles et al. | |
| 6,849,977 B2 * | 2/2005 | Walther et al. | 310/90 |
| 7,074,010 B2 | 7/2006 | DeGroff et al. | |
| 7,082,691 B2 * | 8/2006 | Glantz | 33/290 |
| 7,137,785 B2 | 11/2006 | Van Egeren et al. | |
| 7,708,527 B2 | 5/2010 | Eccles et al. | |
| 2012/0011953 A1 * | 1/2012 | Bortoli | 74/412 R |

* cited by examiner

*Primary Examiner* — Edward Look
*Assistant Examiner* — Juan G Flores
(74) *Attorney, Agent, or Firm* — Carlson, Gaskey & Olds, P.C.

(57) ABSTRACT

A ram air turbine assembly includes a spacer that controls axial movement of a bearing assembly supporting rotation of a driven shaft to limit compression of a bearing biasing member. A gearbox includes mating gears that transfer power through a strut to a generator. Bearings support rotation of the driven shaft and the biasing member generates a biasing load to maintain desired alignment between the mating gears. Axial thrust reversals generated during operation are prevented from fully compressing the biasing member by a spacer that defines a minimum compressed height and that further limits axial movement of the bearing assembly responsive to the thrust reversals of the driven shaft.

18 Claims, 4 Drawing Sheets

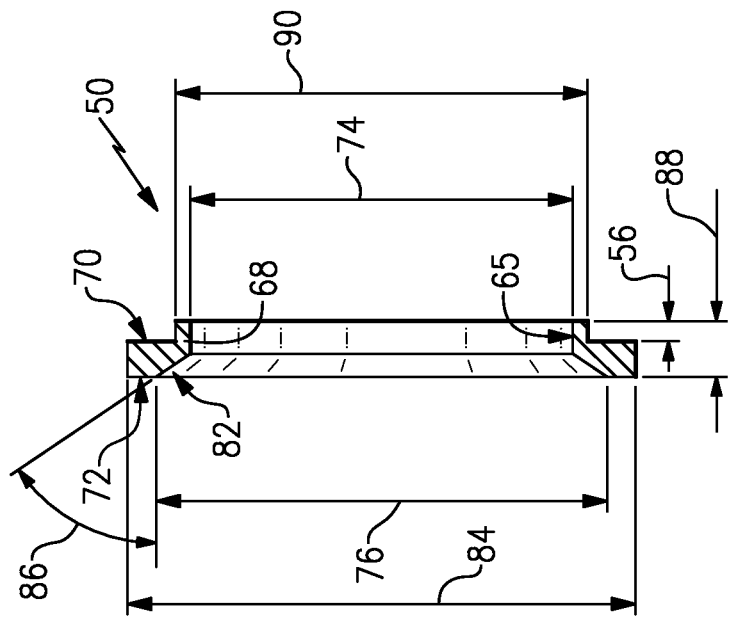
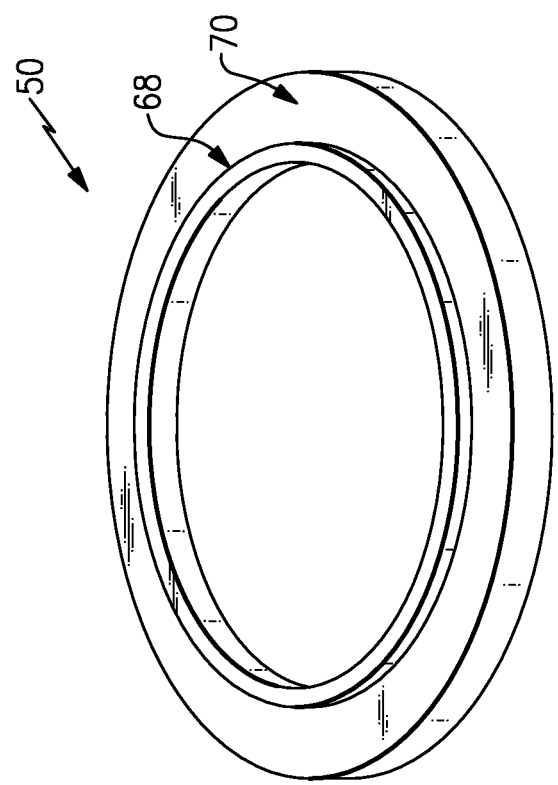
FIG.4B
FIG.4A

RAM AIR TURBINE BEARING SPACER

BACKGROUND

This disclosure generally relates to a gearbox for a ram air turbine assembly. More particularly, this disclosure relates to a bearing preload spring and spacer for supporting rotation of a gear shaft within a gearbox of a ram air turbine.

A ram air turbine (RAT) is a back up power generation device utilized in aircraft. The ram air turbine is deployed into airflow along the exterior of the aircraft and the turbine is driven by the airflow. The turbine may drive a generator, hydraulic pump or other power generation device. A strut or other extension member supports the turbine away from the aircraft. The generator or hydraulic pump may be supported within the RAT assembly and driven by a shaft extending from a gearbox driven by the turbine. During operation, a turbine may encounter cyclical loads that are in turn transmitted through the gearbox and corresponding gear interfaces.

SUMMARY

A disclosed ram air turbine assembly includes a spacer that controls axial movement of a bearing assembly supporting rotation of a driven shaft to limit compression of a bearing biasing member. A turbine drives a generator through a gearbox responsive to airflow. The gearbox includes mating gears that transfer power through a driveshaft to the generator. Bearings support rotation of the driven shaft and the biasing member generates a biasing load to maintain desired alignment between the mating gears and preload on the gear shaft bearings. Axial thrust reversals generated during operation are prevented from fully compressing the biasing member by a spacer that limits axial movement of the bearing assembly responsive to the thrust reversals of the driven shaft.

These and other features disclosed herein can be best understood from the following specification and drawings, the following of which is a brief description.

BRIEF DESCRIPTION OF THE DRAWINGS

FIG. 4A is a perspective view of an example spacer member.
FIG. 4B is a cross sectional view of the example spacer member.

DETAILED DESCRIPTION

Figure 1:
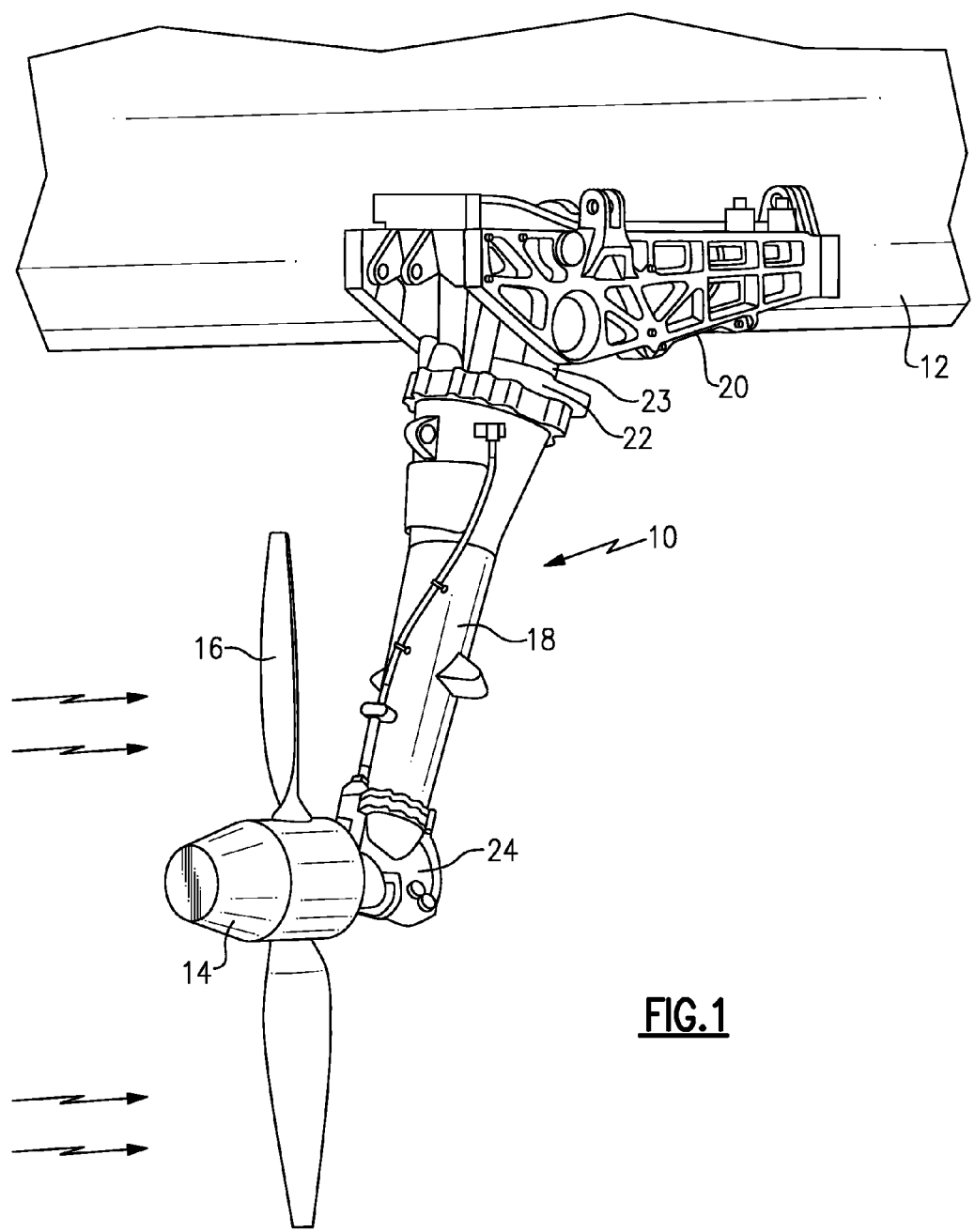
FIG. 1 is a schematic view of an example ram air turbine.

Referring to FIG. 1, a ram air turbine 10 is generally indicated and is movable between a stowed position within an aircraft 12 and a deployed position shown. The ram air turbine 10 includes a turbine 14 with blades 16 that rotate responsive to air flow. The turbine 14 is suspended on a strut 18. The strut 18 supports a gearbox 24 that transmits power from the turbine 14 to a generator 23 mounted within a generator housing 22. The strut 18 is attached to the generator housing 22 that is pivotally attached to support member 20 of the aircraft 12.

The disclosed example includes a generator 23; however the turbine 14 could also be utilized to drive a hydraulic pump or other power generation or conversion device. The ram air turbine 10 is moved to the deployed position shown such that airflow through the turbine blades 16 drive the turbine 14 which in turn drives a turbine shaft 26 (FIG. 2) extending into gearbox 24. The gearbox 24 in turn transmits power with a driveshaft up through strut 18 to drive the example generator 23.

Figure 2:
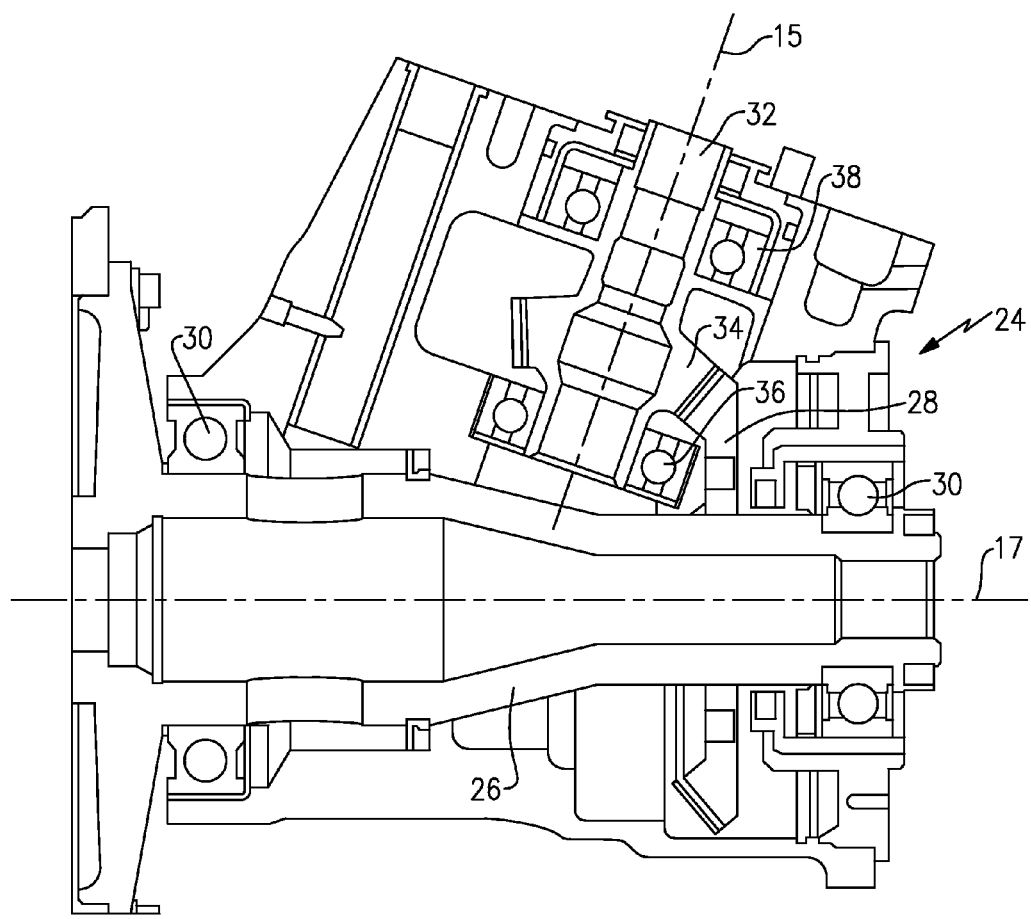
FIG. 2 is a cross sectional view of an example gearbox for a ram air turbine.

Referring to FIG. 2, the turbine shaft 26 is supported for rotation about an axis 17 by bearing assemblies 30. The turbine shaft 26 supports a turbine gear 28. In this example the turbine gear 28 is connected to the turbine shaft 26 using a keyway and drives a pinion gear 34 that is supported on a corresponding pinion shaft 32. The example turbine gear 28 and pinion gear 34 are bevel gears that engage at an angle relative to the axis of rotation 17 of the turbine shaft 26 and axis 15 about which the pinion shaft 32 rotates.

The pinion shaft 32 extends upward from the gearbox 24 through the strut 18 to drive the generator within the generator housing 22 (FIG. 1). The pinion shaft 32 is supported for rotation relative to the turbine shaft 26 within the gearbox 24 by a lower pinion bearing assembly 36 and an upper pinion bearing assembly 38.

The upper and lower pinion bearing assemblies 38, 36 not only support rotation of the pinion shaft 32 but also control axial thrust generated during operation. The lower bearing assembly 36 and upper bearing assembly 38 control axial movement of the pinion shaft 32 and thereby the pinion gear 34 that may occur responsive to driving engagement between the turbine gear 28 and the pinion gear 34.

Figure 3:
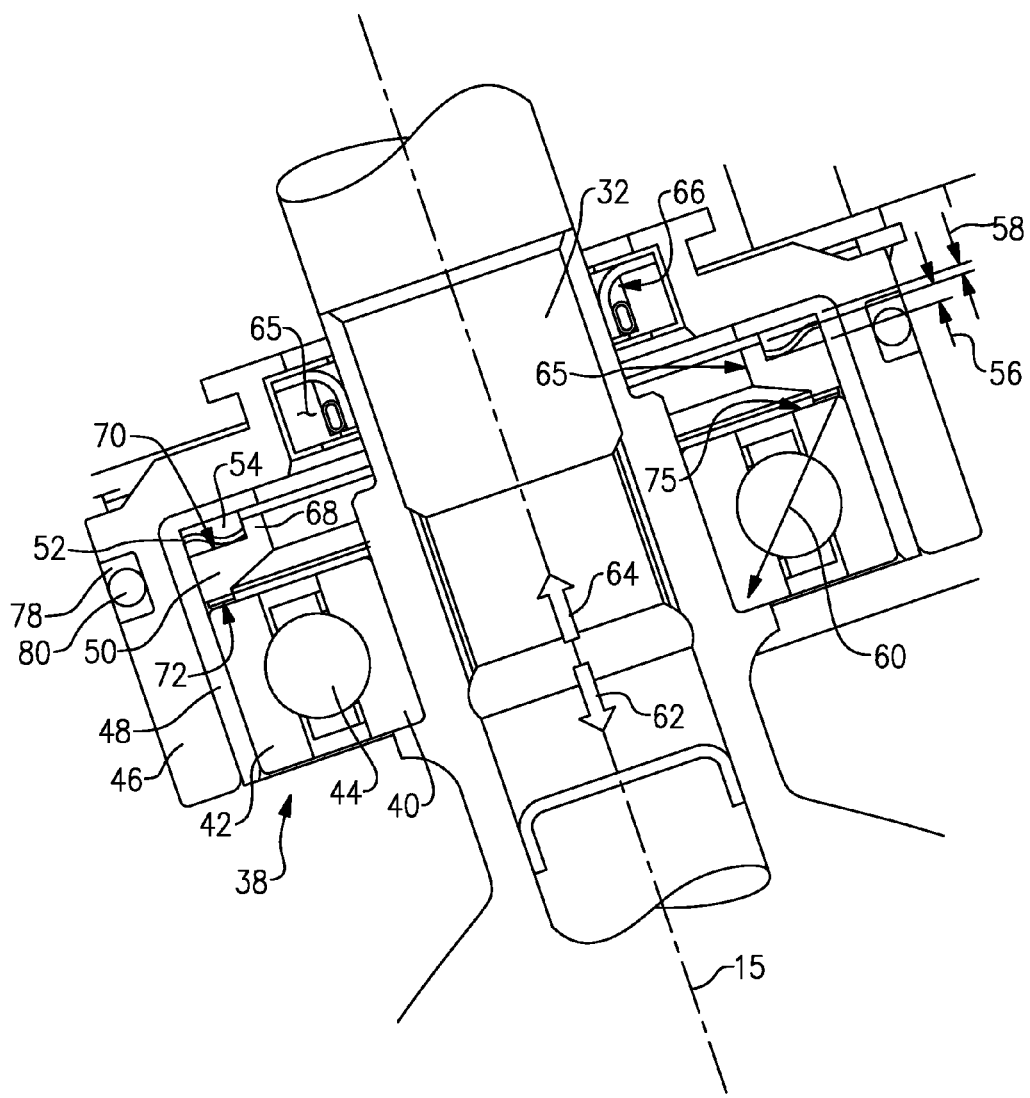
FIG. 3 is an enlarged sectional view of an upper bearing assembly for the example ram air turbine gearbox.

Referring to FIG. 3 with reference to FIGS. 1 and 2, the example upper bearing assembly 38 includes an inner race 40 that is pressed or fixed to the pinion shaft 32. A set of balls 44 are supported between the inner race 40 and an outer race 42. The upper bearing assembly 38 is supported within a retainer 46. In this example, the retainer 46 is constructed of an aluminum material. Within the retainer 46 is disposed a liner 48. The example liner 48 is fabricated from a stainless steel material to provide desired durability and wear characteristics.

Rotation of the pinion shaft 32 as driven by the turbine shaft 26 results in an axial thrust load along the axis 15 in the direction indicated by arrows 62 and 64. Normal axial thrust is in the direction of arrow 62 towards a center point of engagement between turbine gear 28 and the pinion gear 34. However, the torque loads between the turbine shaft 26 and the driving engagement of the pinion shaft 32 with the generator 23 can cause a reversal of the axial load on the pinion shaft 32 as is indicated by arrow 64. A reversal in the axial loads on the pinion shaft 32 can cause misalignment between the pinion gear 34 and the turbine gear 28. Misalignment in turn may cause increased wear of the meshing gear teeth of the turbine gear 28 and pinion gear 34.

A biasing member is utilized that generates a biasing 'preload' force in the direction indicated by arrow 60. The arrow 60 points in a direction generally toward a center point of the engagement interface between the turbine gear 28 and the pinion gear 34. In this example, the biasing member comprises a wavy spring 52 that is disposed within an annular space 54 between a spacer 50 and the sleeve 48 disposed in the retainer 46. The wavy spring 52 is disposed within the annular space 54 defined by the spacer 50. As appreciated, although a wavy spring 52 is shown in this disclosed example, other biasing members such as coil springs, resilient material or other known biasing members.

The annular space 54 defined by the spacer 50 is defined by a lip 68 that extends axially from a shoulder 70. The shoulder 70 defines a seat on which the wavy spring 52 exerts its biasing force downward onto the outer race 42 of the bearing assembly 38. The lip 68 includes an inner surface 65 that defines a first inner diameter 74. The spacer 50 includes a bottom surface 72 that is in direct abutting contact with a first surface 75 of the outer race 42 of the bearing assembly 38.

The spacer 50 is disposed about the pinion shaft 32 with the lip 68 disposed on a radially innermost portion of the shoulder 70. The lip 68 extends the axial distance 56 from the shoulder 70 (FIG. 4B) that is less than the overall axial width 88 (FIG. 4B) of the annular space defined within the retainer 46 such that a gap 58 allows some axial movement of the upper bearing assembly 38 and pinion shaft 32. Reversal of axial thrust forces in the direction indicated by arrow 64 could flatten out the wavy spring 52. However, the annular space 54 defined by the lip 68 of the spacer 50 prevents complete compression of the wavy spring 52. Instead, the example lip 68 that extends the axial distance 56 from the shoulder 70 defines a maximum compression height allowable for the wavy spring 52. The lip 68 will contact the sleeve 48 prior to the wavy spring 52 reaching a fully compressed or flattened state. The wavy spring 52 remains safely within the annular space 54 defined by the lip 68.

The retainer 46 also includes an upper annular cavity 65 that houses a lip seal 66. The lip seal 66 is biased against the outer surface of the rotating pinion shaft 32. The lip seal 66 provides a desired seal to prevent lubricants from leaving the gearbox or other external contaminants from entering the gearbox and interfering with operation of the bearing assembly 38.

Referring to FIGS. 4A and 4B, the example disclosed spacer 50 is generally ring shaped and includes a first inner diameter 74 that extends to a second inner diameter 76 that is larger than the first inner diameter 74. An angled surface 82 extends at an angle 86 between the first and second diameters 74 and 76. The angle 86 in a non-limiting dimensional embodiment is provided in range between 60° and 70°. The bottom surface 72 is disposed radially outward from the second inner diameter 76 to an outer diameter 84.

In a non-limiting dimensional embodiment the outer diameter 84 is provided within a range of 2.439 inches (61.95 mm) and 2.429 inches (61.70 mm) and the inner diameter 74 is provided in a range between 1.850 inches (46.99 mm) and 1.830 inches (46.48 mm). A ratio of the outer diameter 84 to the inner diameter 74 being between 1.31 and 1.33.

In a non-limiting dimensional embodiment, the inner diameter 76 is provided within a range of 2.205 inches (56.01 mm) and 2.25 inches (57.15 mm). A ratio between the outer diameter 84 and the inner diameter 76 is between 1.091 and 1.106. As appreciated, the example may be scaled in size to tailor the spacer configuration to application specific requirements.

The ratios between the outer diameter 84 and the two inner diameters 74 and 76 define the surface 72 that abuts the outer race of the 42. Accordingly, the dimensions of the surface 72 provide the desired durability and wear properties of the spacer 50. Moreover, the lip 68 is defined between the inner diameter 74 and an outer diameter 90. In a non-limiting embodiment, the outer diameter 90 is defined within a range of 1.990 inches (50.55 mm) and 1.970 inches (50.04 mm) and is in concert with the inner diameter 74 defines the surface area of the lip 68 that contacts the retainer 46 in the event of a thrust reversal. In this disclosed example, a ratio of the outer diameter 90 to the inner diameter 74 is between 1.06 and 1.09.

The spacer 50 includes the shoulder 70 and the lip 68 that extends from the shoulder 70. The lip 68 defines the axial distance 56 (Also see FIG. 3). The axial distance 56 is determined relative to the biasing member, in this disclosed example the wavy spring 52. The axial distance 56 is determined to provide a minimum compressed height of the wavy spring 52. In other words, the maximum compression of the wavy spring 52 is attained only when the lip 68 comes into contact with the corresponding surface of the liner 48.

The lip 68 is defined as the axial distance 56 from the shoulder 70 and is related to the overall width 88 of the spacer 50 to provide a desired space for the biasing member 52. In one non-limiting embodiment the distance 56 is provided in a range between 0.072 inches (1.83 mm) and 0.082 inches (2.08 mm) and the overall width 88 is provided in a range between 0.180 inches (4.57 mm) and 0.170 inches (4.32 mm). A ratio of the total width 88 relative to the distance 56 being between 2.95 and 3.64.

The lip 68 limits and controls movement of the bearing assembly 38 in response to axial thrust reversal indicated by the arrow 64. The biasing wavy spring 52 the bearing assembly 38 towards the center of the interface between the pinion gear 34 and the turbine gear 28. However, when the axial thrust force indicated by 64 exceeds the biasing force of the wavy spring 52, the spacer 50 and lip 68 prevent over compression of the wavy spring 52 in the interim until the axial thrust forces return to the direction indicated by arrow 62.

Referring back to FIG. 3 with continued reference to FIG. 2, the example bearing assembly 38 is a component part of a replaceable unit supported within the retainer 46. The retainer 46 includes the liner 48 and the bearing assembly 38 including the inner outer races and the ball 44 disposed therebetween. The liner 48 is provided between the bearing assembly 38 and the inner surface of the retainer 46. The liner 48 is provided in this example to provide a wear bearing surface that is more durable than the retainer assembly 46. In this example, the retainer 46 is fabricated from an aluminum material for weight saving purposes.

The retainer 46 also defines an external groove 78 that supports a seal 80. During maintenance operations the entire containment case 46 can be removed and replaced. Alternatively, the retainer 46 may be removed so that the wavy spring 52 and bearing assembly 38 may be replaced followed by reinstallation of the retainer 46 about the pinion shaft 32.

As appreciated, although the example retainer 46 is fabricated from aluminum material, the example retainer 46 may also be fabricated from other material to relieve the need for the use of another part as is disclosed as the liner 48. In such an instance, the retainer 46 would include dimensions that support and hold the bearing assembly 38 as desired.

Accordingly, the wavy spring 52 provides the desired bias on the bearing assembly 38 to counter thrust reversals and maintain a desired relative orientation between the pinion gear 34 and turbine gear 28. Moreover, the example spacer 50 prevents over compression of the wavy spring 52 in a manner that provides an increase in durability. Additionally, the spacer 50 limits maximum movement of the bearing assembly 38 in response to possible thrust reversals during operation.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A spacer member for limiting compression of a bearing preload spring, the spacer member comprising:
 a bearing assembly;
 a shoulder for receiving the preload spring; and
 a lip extending axially from the shoulder for limiting compression of the preload spring, wherein the lip extends a distance from the shoulder equal to a minimum desired height of the preload spring.

2. The spacer member as recited in claim 1, wherein the lip includes an inner surface that defines an opening.

3. The spacer member as recited in claim 2, wherein the bearing assembly includes a first surface transverse to an axis through the opening.

4. The spacer member as recited in claim 3, including an angled surface extending radially inwardly from the first surface to the inner surface of the lip.

5. The spacer member as recited in claim 2, wherein an axial facing surface is defined between the inner surface and an outer diameter of the lip, wherein a diameter of the inner surface is related to the outer diameter according to a ratio between 1.06 and 1.09.

6. The spacer member as recited in claim 1, wherein the distance from the shoulder is related to an overall width of the spacer by a ratio between 2.95 and 3.64.

7. A ram air turbine gearbox assembly comprising:
a shaft supporting at least one gear;
a bearing assembly supporting rotation of the shaft;
a biasing member biasing the bearing assembly in a first direction; and
a spacer between the biasing member and the bearing assembly limiting compression of the biasing member, wherein the spacer includes a lip that defines a minimum compressed height of the biasing member.

8. The ram air turbine gearbox assembly as recited in claim 7, wherein the spacer includes a shoulder on which the biasing member is received and the lip extends axially from the shoulder.

9. The ram air turbine gearbox assembly as recited in claim 8, wherein the lip includes an axial length above the shoulder equal to the minimum compressed height of the biasing member.

10. The ram air turbine gearbox assembly as recited in claim 7, wherein the bearing assembly and spacer are supported within a retainer.

11. The ram air turbine gearbox assembly as recited in claim 10, including a liner disposed within the retainer case between the bearing assembly, spacer, biasing member and the retainer.

12. A ram air turbine assembly comprising:
a turbine driving a turbine shaft responsive to airflow;
a drive shaft driven by the turbine shaft;
a bearing assembly supporting rotation of the drive shaft;
a biasing member biasing the bearing assembly in a first direction; and
a spacer disposed between the biasing member and the bearing assembly, wherein the spacer includes a lip that includes a length that defines a minimum height of the biasing member for limiting compression of the biasing member.

13. The ram air turbine assembly as recited in claim 12, wherein the turbine shaft and the drive shaft include corresponding gears disposed within a gearbox and the bearing assembly is mounted within the gearbox.

14. The ram air turbine assembly as recited in claim 13, wherein the drive shaft and bearing assembly is movable axially and the biasing member biases the bearing assembly in the first direction and the spacer limits axial movement of the bearing assembly in a second direction opposite the first direction.

15. The ram air turbine assembly as recited in claim 12, wherein the spacer includes a shoulder on which the biasing member is seated and the lip extends axially form the shoulder.

16. A method of installing a bearing assembly in a ram air turbine assembly, the method comprising the steps of:
mounting a bearing onto an outer surface of a driven shaft;
defining an annular space around the driven shaft between the bearing and a fixed surface;
installing a spacer within the annular space that engages the bearing on a first side;
installing a biasing member between the spacer and the fixed surface for biasing the spacer into contact with the bearing such that the bearing is biased in a first axial direction; and
defining with the spacer a minimum height of the biasing member for preventing compression of the biasing member past a defined height.

17. The method as recited in claim 16, including defining a shoulder transverse to an axis of rotation with the spacer and a lip extending axially from the shoulder such that an axial length of the lip defines the minimum height of the biasing member.

18. The method as recited in claim 16, including mounting the bearing spacer and biasing member within a retainer and mounting the retainer about the driven shaft within a gearbox.

* * * * *